(12) United States Patent
Chen et al.

(10) Patent No.: US 10,025,395 B2
(45) Date of Patent: Jul. 17, 2018

(54) IMAGE-CAPTURING DEVICE CONFIGURED FOR A 3D SPACE OPTICAL POINTING APPARATUS WITH ADJUSTABLE RESOLUTION SETTING

(71) Applicant: PIXART IMAGING INC., Hsin-Chu County (TW)

(72) Inventors: Hsin-Chia Chen, Hsin-Chu County (TW); Yen-Min Chang, Hsin-Chu County (TW)

(73) Assignee: PIXART IMAGING INC., Hsin-Chu County (TW)

(*) Notice: Subject to any disclaimer, the term of this patent is extended or adjusted under 35 U.S.C. 154(b) by 0 days.

(21) Appl. No.: 15/205,270

(22) Filed: Jul. 8, 2016

(65) Prior Publication Data

US 2016/0320865 A1 Nov. 3, 2016

Related U.S. Application Data

(63) Continuation-in-part of application No. 13/368,637, filed on Feb. 8, 2012, now Pat. No. 9,417,713.

(30) Foreign Application Priority Data

Feb. 16, 2011 (TW) .............................. 100105043 A (51) Int. Cl.
*G06F 3/0346* (2013.01)
*G06F 3/03* (2006.01)

(52) U.S. Cl.
CPC .......... *G06F 3/0346* (2013.01); *G06F 3/0317* (2013.01)

(58) Field of Classification Search
CPC ........ G06F 3/03; G06F 3/0304; G06F 3/0308; G06F 3/0317; G06F 3/0321; G06F 3/042; G06F 3/0425
See application file for complete search history.

(56) References Cited

U.S. PATENT DOCUMENTS

| | | | |
|---|---|---|---|
| 7,256,387 B2 | 8/2007 | Kwak | |
| 7,679,605 B2 | 3/2010 | Cheah et al. | |
| 2007/0216644 A1* | 9/2007 | Nam | G06F 3/0386 345/158 |
| 2007/0247428 A1 | 10/2007 | Hock et al. | |
| 2008/0007526 A1 | 1/2008 | Waters et al. | |
| 2008/0174787 A1* | 7/2008 | Teo | G01S 17/50 356/614 |
| 2008/0252602 A1 | 10/2008 | Kakarala et al. | |
| 2009/0026351 A1* | 1/2009 | Itagaki | G06F 3/0317 250/206.1 |
| 2009/0195503 A1* | 8/2009 | Lee | G06F 3/0317 345/166 |

\* cited by examiner

*Primary Examiner* — Lisa Landis
(74) *Attorney, Agent, or Firm* — Hauptman Ham, LLP (57) ABSTRACT

An image-capturing device configured for a 3D space optical pointing apparatus, comprising: a plurality of adjacently arranged image-sensing units configured to sense an image of a 3D space and generate successive plane frame images, each comprising a plurality of sensing signals respectively, being adapted to evaluate a velocity and a position relative to a surface of the optical pointing apparatus. The velocity and position information can be applied to adjust the resolution setting of the image-capturing device.

15 Claims, 9 Drawing Sheets

IMAGE-CAPTURING DEVICE CONFIGURED FOR A 3D SPACE OPTICAL POINTING APPARATUS WITH ADJUSTABLE RESOLUTION SETTING

CROSS-REFERENCE TO RELATED APPLICATION

The present application is a continuation-in-part application of U.S. application Ser. No. 13/368,637, filed Feb. 8, 2012 and based on, and claims priority from, Taiwan Application Serial Number 100105043, filed on Feb. 16, 2011, the disclosures of which are hereby incorporated by reference herein in their entirety.

BACKGROUND

1. Technical Field

The present invention relates to an image-capturing device configured for a 3D space optical pointing apparatus with image-capturing device with adjustable resolution setting.

2. Related Art

Pointing apparatuses such as an electronic mouse are devices that can detect their displacements relative to their supporting surfaces. A user grasps a pointing apparatus and slides the pointing apparatus on a planar surface. The pointing apparatus may compute its displacement relative to the planar surface, and may use the displacement as an input signal sent to a computer. A conventional pointing apparatus may compute its displacement according to the number of rolling cycles counted by the roller on the apparatus as the device rolls on a surface. However, accumulated dust may adversely affect the accuracy of the calculation of the displacement of the roller pointing apparatus after the roller pointing apparatus has been used for a long time. Due to such disadvantage, with the development of technology, optical pointing apparatuses such as the optical mouse increasingly replace such roller pointing apparatuses.

Figure 1:
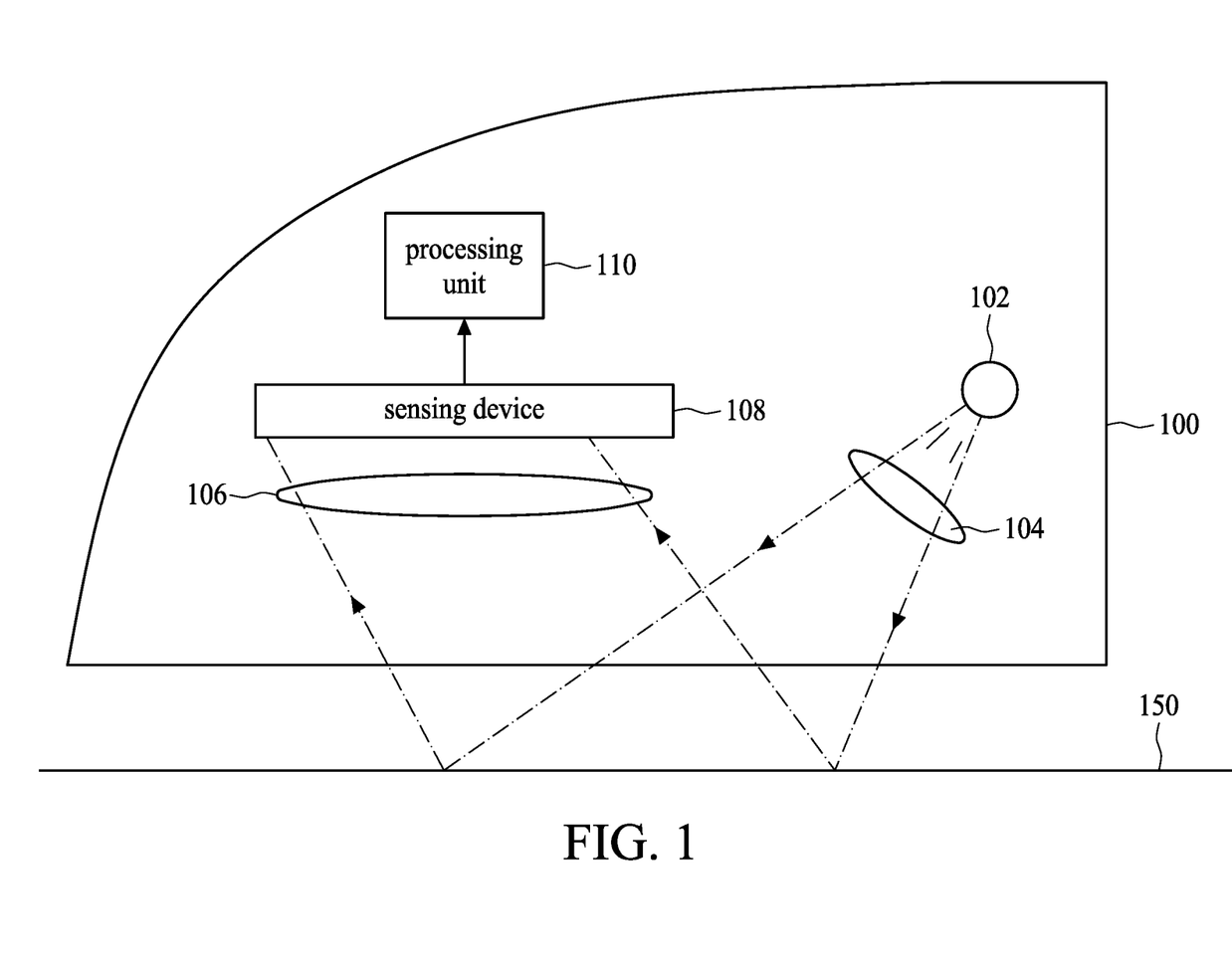
FIG. 1 shows a conventional optical pointing apparatus.

Optical pointing apparatuses similarly detect their displacements relative to their supporting surfaces. Unlike conventional roller pointing apparatuses, optical pointing apparatuses detect their displacements based on reflective light. FIG. 1 shows a conventional optical pointing apparatus. As shown in FIG. 1, the optical pointing apparatus 100 comprises a light source 102, a focus lens 104, a light extraction lens 106, a sensing device 108, and a processing unit 110. The light source 102 may be an LED (light-emitting diode) based light source or a laser, which projects light through the focus lens 104 onto a planar surface 150. The planar surface 150 reflects the light, and the light extraction lens 106 collects reflective light and brings it to the sensing device 108. The processing unit 110 uses output signals from the sensing device 108 to calculate the displacement of the optical pointing apparatus 100 relative to the planar surface 150.

Figure 2:
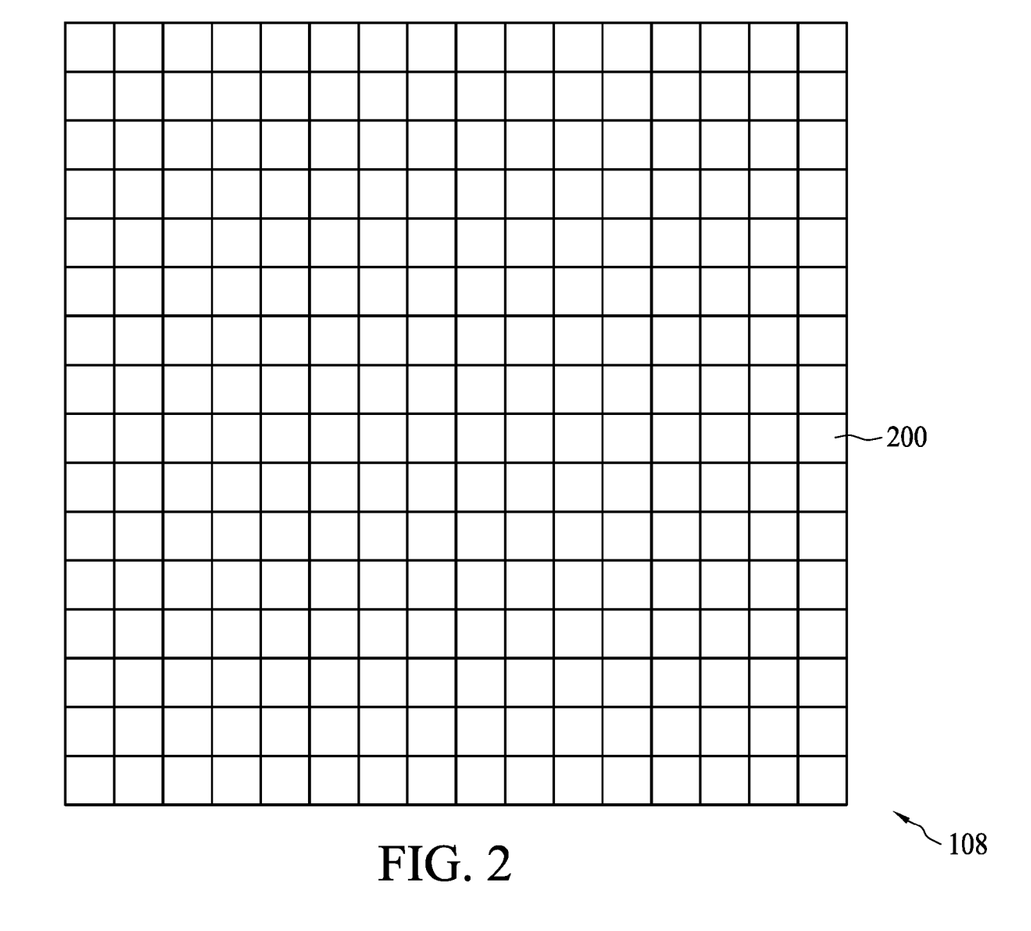
FIG. 2 shows an enlarged sensing device.

FIG. 2 shows an enlarged sensing device 108. As illustrated in FIG. 2, the sensing device 108 comprises a plurality of image-sensing elements 200 arranged in an array. The image-sensing elements 200 may capture the image of the planar surface 150 whereby the output signals are generated. The processing unit 110 compares the correlation between two successive images, and determines the displacement of the optical pointing apparatus 100 relative to the planar surface 150 by the relative orientation and distance between two highly correlated regions. For example, if the comparison result from the processing unit 110 shows that the second image is highly correlated with the upper left region of the first image, it can be determined that the optical pointing apparatus 100 is moving in the lower right direction.

Generally, under the condition that the number of image-sensing elements 200 is the same, if the areas of the image-sensing elements 200 are larger, the resolution of the image-sensing elements 200 is lower; while if the areas of the image-sensing elements 200 are smaller, the detectable displacement range is smaller. In other words, regardless whether the areas of the image-sensing elements 200 are large or small, the performance of the optical pointing apparatus 100 has its own limitation. The optical pointing apparatus with large area image-sensing units has poor resolution that causes users to experience non-smooth cursor movements. In contrast, with optical pointing apparatus with small area image-sensing units, the user needs to move the optical pointing apparatus farther to obtain sufficient accuracy of desired input signals, and the optical pointing apparatus with small area image-sensing units leads to a smaller detectable displacement range.

Therefore, the relevant industry needs a new optical pointing apparatus.

SUMMARY

Embodiments provide an image-capturing device that is configured for an optical apparatus and has the advantages of both optical pointing apparatus with large and small area image-sensing units so as to meet different usage requirements.

In one embodiment, an image-capturing device configured for an optical pointing apparatus comprises a plurality of adjacently arranged image-sensing units. The plurality of adjacently arranged image-sensing units is configured to sense an image of a surface and generate a sensing signal that can be used to evaluate a velocity of the optical pointing apparatus. The image-capturing device uses different arrangements of the image-sensing units to sense the image of the surface according to the velocity of the optical pointing apparatus. When the optical pointing apparatus moves at a first velocity, the image-capturing device uses image-sensing units configured to occupy a smaller area to sense the surface; and when the optical pointing apparatus moves at a second velocity, the image-capturing device uses image-sensing units configured to occupy a larger area to sense the surface, wherein the first velocity is lower than the second velocity.

In another embodiment, an image-capturing device configured for an optical pointing apparatus comprises a plurality of adjacently arranged image-sensing units. The plurality of adjacently arranged image-sensing units is configured to sense an image of a surface and generate a sensing signal that can be used to evaluate a velocity of the optical pointing apparatus. The image-capturing device uses different arrangements of the image-sensing units to sense the image of the surface according to the velocity of the optical pointing apparatus. When the optical pointing apparatus moves at a first velocity, the image-capturing device is configured to use a plurality of image-sensing units with high count-per-inch (CPI) resolution to sense the surface; and when the optical pointing apparatus moves at a second velocity, the image-capturing device uses a plurality of image-sensing units with low count-per-inch resolution to sense the surface, wherein the first velocity is lower than the second velocity.

The present disclose further provides an image-capturing device configured for a 3D space optical pointing apparatus. The image-capturing device includes a plurality of adjacently arranged image-sensing units configured to sense an image of a 3D space and generate successive plane frame images, each comprising a plurality of sensing signals respectively, being adapted to evaluate a velocity and a position relative to a surface of the optical pointing apparatus, wherein the image-capturing device uses different arrangements of the image-sensing units to sense the image of the 3D space, and generates at least one of a velocity index and a position index according to the velocity and the position of the optical pointing apparatus respectively, wherein when the velocity index exceeds a first reference value, the image-capturing device is configured to sense the image with a high-resolution arrangement of the image-sensing units, and when the velocity index exceeds a second reference value, the image-capturing device is configured to sense the image with a low-resolution arrangement of the image-sensing units, and wherein when the position index exceeds a third reference value, the image-capturing device is configured to sense the image with a high-resolution arrangement of the image-sensing units, and when the position index exceeds a forth reference value, the image-capturing device is configured to sense the image with a low-resolution arrangement of the image-sensing units.

To better understand the above-described objectives, characteristics and advantages of the present invention, embodiments, with reference to the drawings, are provided for detailed explanations.

BRIEF DESCRIPTION OF THE DRAWINGS

The invention will be described according to the appended drawings in which.

DETAILED DESCRIPTION OF DISCLOSED EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 3:
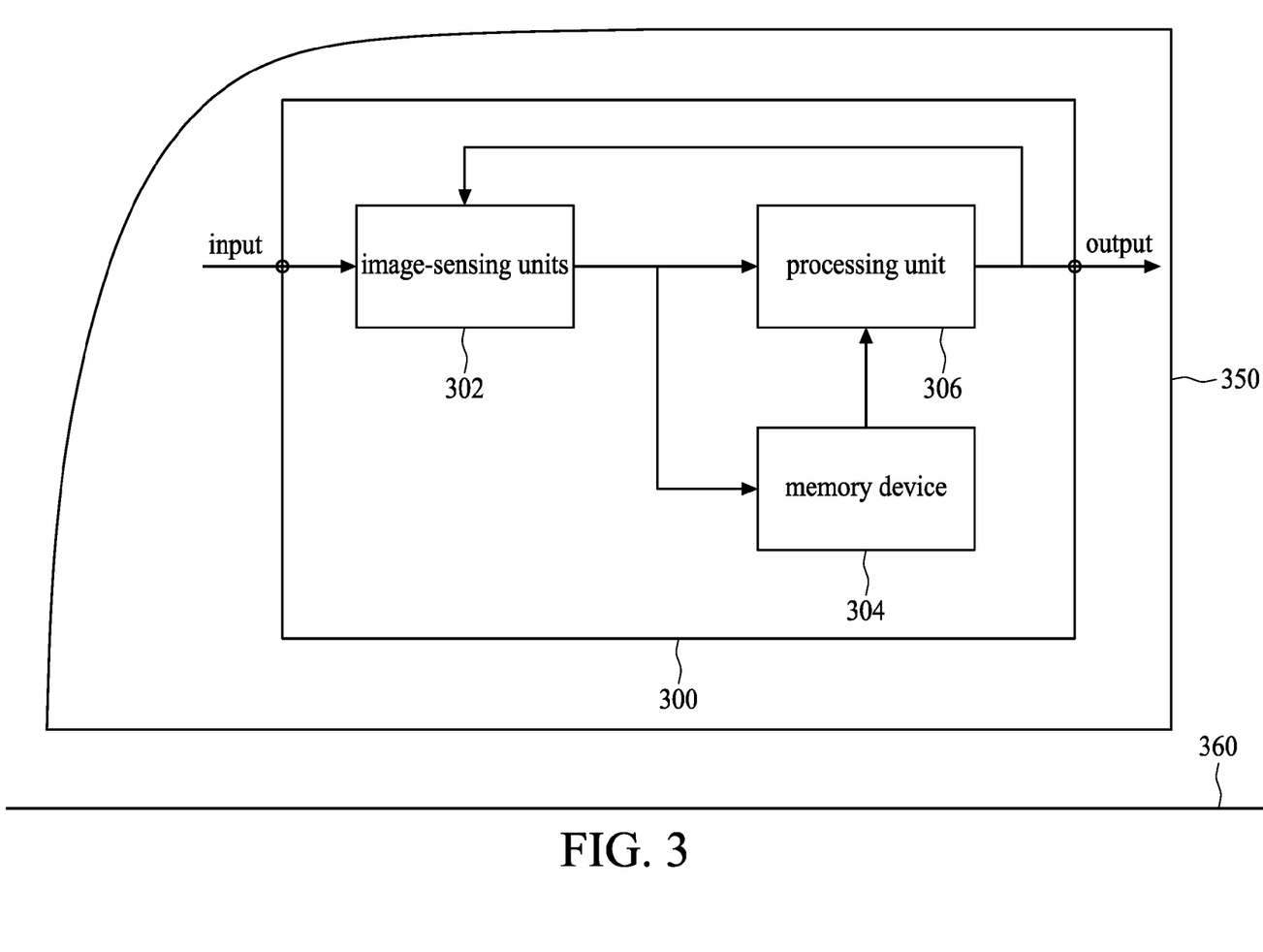
FIG. 3 is a view showing an image-capturing device configured for an optical pointing apparatus according to one embodiment of the present invention.

FIG. 3 is a view showing an image-capturing device configured for an optical pointing apparatus according to one embodiment of the present invention. Referring to FIG. 3, the image-capturing device 300 can be installed in an optical pointing apparatus 350 and comprises a plurality of image-sensing units 302 arranged adjacently, a memory device 304, and a processing unit 306. The optical pointing apparatus 350 can slide relative to a planar surface 360. The image-sensing units 302 are configured to sense images of a surface and to generate sensing signals that can be used to evaluate the velocity of the optical pointing apparatus 350. The memory device 304 is configured to store the sensing signals generated by the image-sensing units 302. The processing unit 306 is configured to compare the sensing signals stored in the memory device 304 with the sensing signals generated by the image-sensing units 302 to compute the distance of the movement of the optical pointing apparatus 350.

Figure 4:
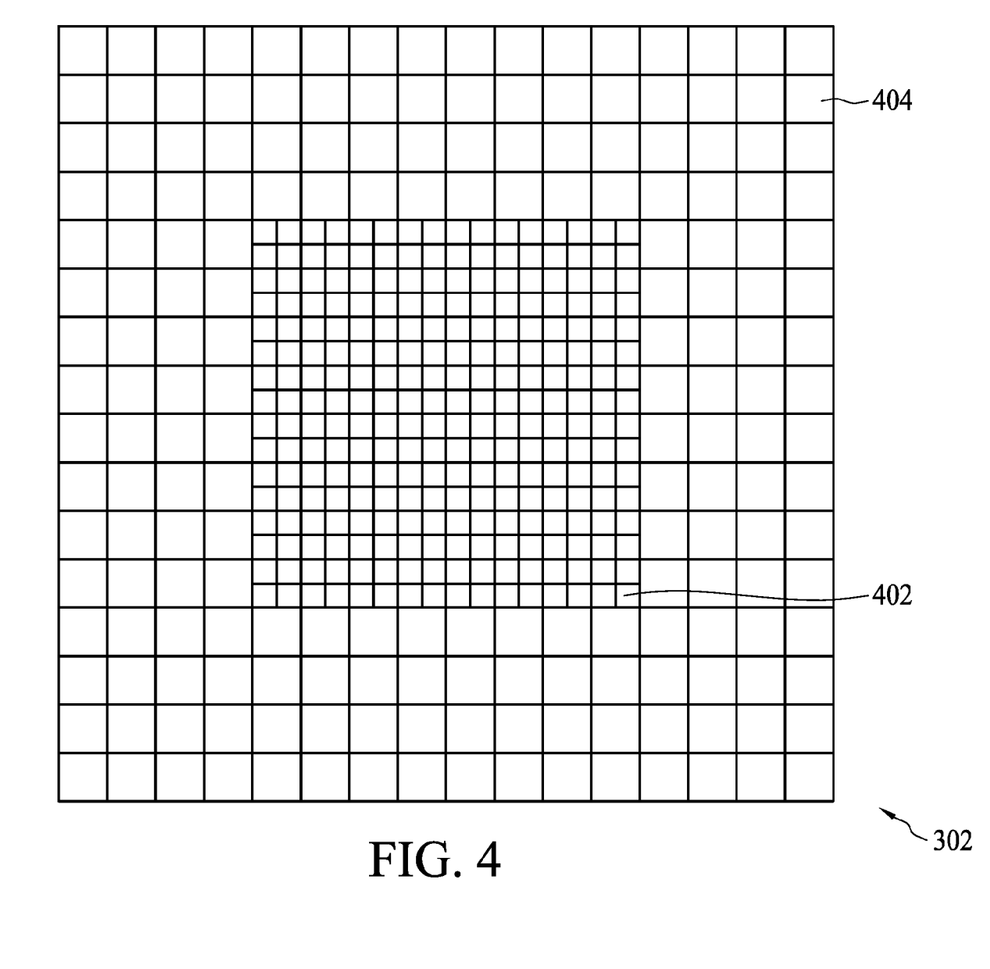
FIG. 4 is an enlarged view showing image-sensing units according to one embodiment of the present invention.

FIG. 4 is an enlarged view showing image-sensing units 302 according to one embodiment of the present invention. As shown in FIG. 4, the central region of the image-sensing units 302 comprises 256 image-sensing units 402 with small areas. The circumambient region of the image-sensing units 302 comprises 192 image-sensing units 404 with large areas, wherein the area of each image-sensing unit 404 is equal to 4 times the area of the image-sensing unit 402.

Referring to FIG. 3 again, the image-capturing device 300 may use different image-sensing units 302 to capture the image of the planar surface 360 by different velocities of the optical pointing apparatus 350. For example, when the optical pointing apparatus 350 moves at a first velocity, the image-capturing device 300 may be configured to use the small-area image-sensing units 402 to capture the image of the planar surface 360; whereas when the optical pointing apparatus 350 moves at a second velocity, the image-capturing device 300 may be configured to use the large-area image-sensing units 404 to capture the image of the planar surface 360, wherein the first velocity is lower than the second velocity. The small-area image-sensing units 402 constitute a sensing field of small dimension, and the image-capturing device 300 is configured to use the sensing field of small dimension to sense the surface 360 when the optical pointing apparatus 350 moves at a low velocity. Similarly, the image-capturing device 300 is configured to use the sensing field of large dimension to sense the surface 360 when the optical pointing apparatus 350 moves fast. When a user moves the optical pointing apparatus 350 slowly, the user most likely expects more precise computer input signals, and the high resolution provided by the sensing field of small dimension constituted by the small-area image-sensing units 402 can meet such expectation. When a user moves the optical pointing apparatus 350 fast, the sensing field of large dimension constituted by the large-area image-sensing units 404 can provide the capability to rapidly track the motion trajectory of the optical pointing apparatus 350. Therefore, the image-capturing device 300 may provide different sensing solutions according to different application conditions.

In another embodiment of the present invention, the image-sensing units 302 comprise high spatial resolution and low spatial resolution image-sensing units. When a user moves the optical pointing apparatus 350 at a slow velocity, the image-capturing device 300 employs the high count-per-inch (CPI) image-sensing units 302 to capture the image of the surface 360. When a user moves the optical pointing apparatus 350 at a high velocity, the image-capturing device 300 employs the low CPI image-sensing units 302 to capture the image of the surface 360.

Figure 5:
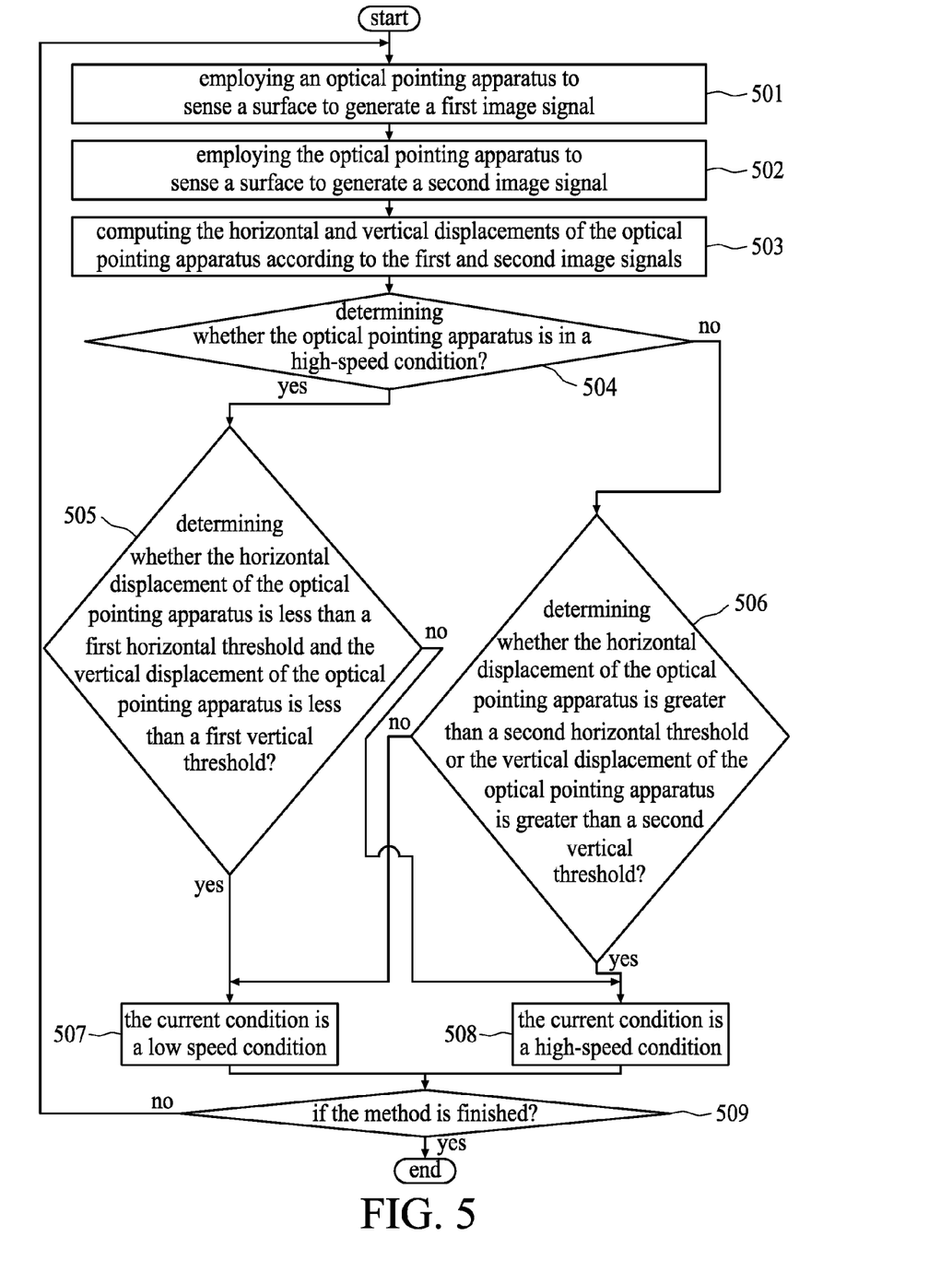
FIG. 5 is a flow diagram showing the steps of a method of calculating the displacement of an optical pointing apparatus according to one embodiment of the present invention.

FIG. 5 is a flow diagram showing the steps of a method of calculating the displacement of an optical pointing apparatus according to one embodiment of the present invention, wherein the calculating method can be applied to the processing unit 306. In Step 501, an optical pointing apparatus is employed to sense a surface to generate a first image signal, and the method then proceeds to Step 502. In Step 502, the optical pointing apparatus is employed to sense a surface to generate a second image signal, and the method proceeds to Step 503. In Step 503, the displacements of the optical pointing apparatus along the vertical and horizontal directions are computed according to the first and second image signals, and the method proceeds to Step 504. In Step 504, it is determined whether the optical pointing apparatus is in a high-velocity condition. If yes, the method proceeds to Step 505; otherwise the method proceeds to Step 506. In Step 505, the horizontal displacement and the vertical displacement of the optical pointing apparatus are compared with thresholds. If the horizontal displacement of the optical pointing apparatus is less than a first horizontal threshold and the vertical displacement of the optical pointing apparatus is less than a first vertical threshold, the method proceeds to Step 507; otherwise, the method proceeds to Step 508. In Step 506, the horizontal displacement and the vertical displacement of the optical pointing apparatus are compared with thresholds. If the horizontal displacement of the optical pointing apparatus is greater than a second horizontal threshold or the vertical displacement of the optical pointing apparatus is greater than a second vertical threshold, the method proceeds to Step 508; otherwise, the method proceeds to Step 507. In Step 507, the current condition is determined as a low velocity condition, a sensing field of small dimension is employed as the operative sensing field of the optical pointing apparatus, and the method proceeds to Step 509. In Step 508, the current condition is determined as a high-velocity condition, a sensing field of large dimension is employed as the operative sensing field of the optical pointing apparatus, and the method proceeds to Step 509. In Step 509, it is determined whether the method is finished. If yes, the method is terminated; otherwise, the method returns to Step 501.

Figure 6:
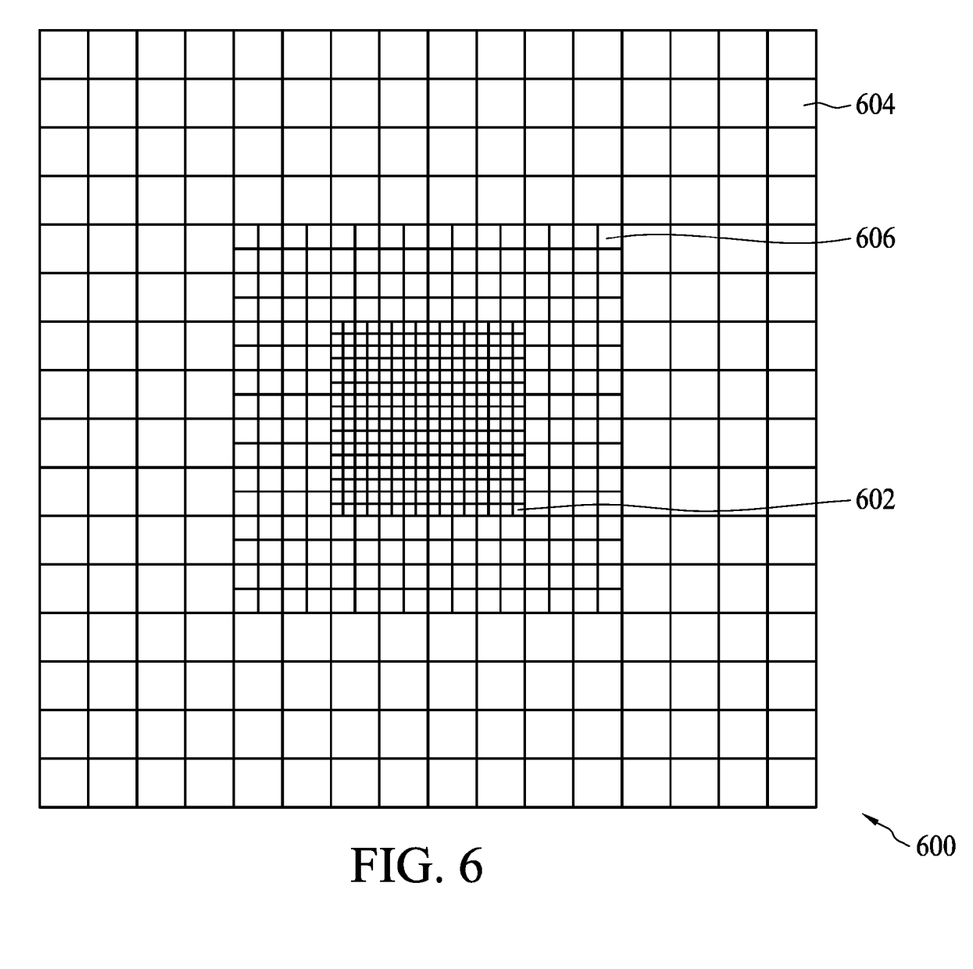
FIG. 6 is an enlarged view showing image-sensing units of an image-capturing device according to another embodiment of the present invention.

FIG. 6 is an enlarged view showing image-sensing units 600 of an image-capturing device according to another embodiment of the present invention. As shown in FIG. 6, the central region of the image-sensing units 600 comprises 256 small area image-sensing units 602. The circumambient region of the image-sensing units 600 comprises 192 large area image-sensing units 604. The middle region between the small area image-sensing units 602 and the large area image-sensing units 604 comprises 192 medium area image-sensing units 606. With this arrangement, the image-sensing units 600 can, in response to the velocity of the image-capturing device, employ the image-sensing units 602, 604 and 606 with different dimensions to provide high resolution or low resolution sensing fields.

Figure 7:
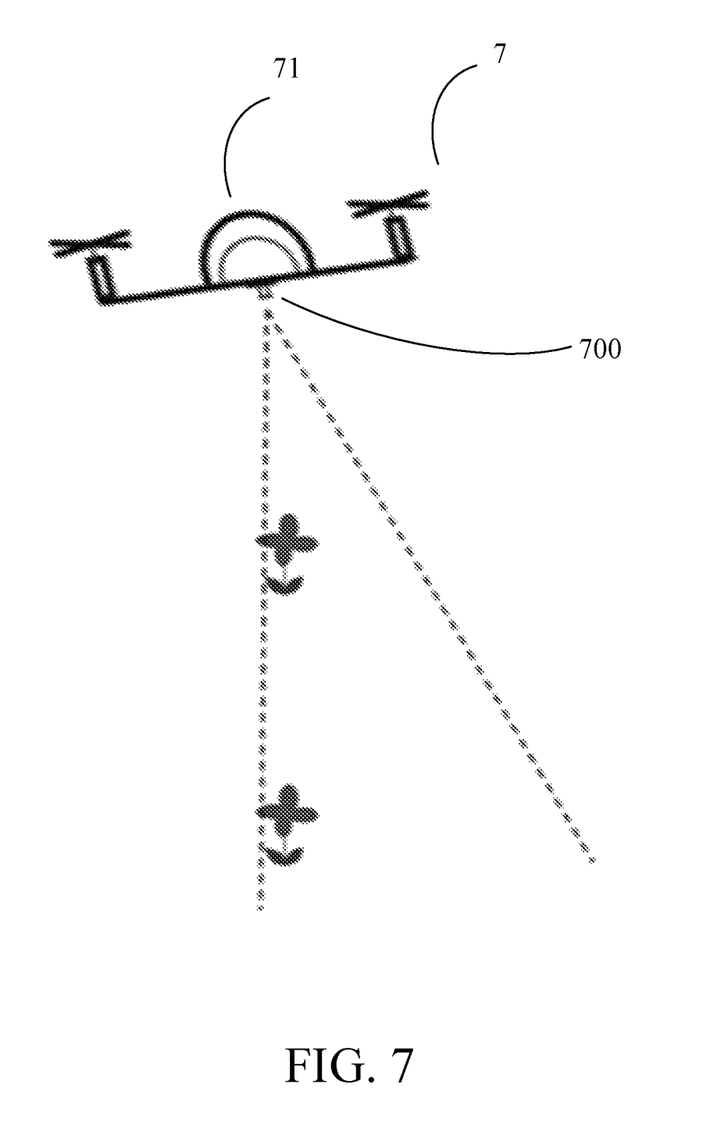
FIG. 7 is another embodiment of the present invention showing an image-capturing device configured for a 3D space optical pointing apparatus.

FIG. 7 illustrates another embodiment of the present invention. The present invention is applicable on an air drone system 7. An air drone is able to move freely in a 3D space by mechanical power, such as multi-axle airscrews. Usually the air drone would require the ability of hanging over or moving smoothly in space, which means the air drone would apply different kinds of sensors to achieve the aforementioned purposes.

The optical pointing apparatus 71 represents an air drone, and it applies an image-capturing device 700 to evaluate (e.g., using a built-in digital signal processor or a microprocessor) a velocity and a position of the optical pointing apparatus 71 relative to a surface below the air drone. The optical pointing apparatus 71 can apply the image-capturing device 700 to capture images of the surface below the air drone. Usually the surface is ground, but in an indoor environment, for example, it can be the top portion of furniture. Taking one plane frame image is not sufficient for the image-capturing device 700 to accomplish the aforementioned detecting function (e.g., evaluating velocity and position). By taking successive plane frame images, each comprising a plurality of sensing signals (e.g., gray values) respectively, the plane frame images would contain variation among pixels, and the variation can be applied in detection functions.

The sensing signal generated by the image-capturing device 700 includes at least one pattern (or brightness distribution), and the shape variation of the pattern is configured to estimate the position of the optical pointing apparatus 71 relative to the surface; wherein the shape variation occupies more pixels as the optical pointing apparatus 71 being close to the surface and vice versa. The sensing signal generated by the image-capturing device 700 includes at least one pattern, and the patterns recognized as representing the same object in different frame images are configured to estimate the velocity of the optical pointing apparatus 71 relative to the surface; wherein the displacement of the patterns recognized as representing the same object in different frame images increases as the optical pointing apparatus 71 goes fast and vice versa. When the air drone turns dramatically, it would also cause sharp variation of velocity since velocity contains both speed and direction information. And, in some cases, the user may control the air drone to hover over a particular height by evaluating the velocity and position.

The velocity and position information can be applied to adjust the resolution setting of the image-capturing device 700, e.g., selecting from a plurality of predetermined resolution arrangements previously stored in a memory. Since the air drone consumes battery power, it is necessary to save power in all operations, and low resolution setting would be helpful. The image-capturing device 700 uses different arrangements of the image-sensing units (or pixels) to sense the image of the 3D space, and generates at least one of a velocity index and a position index according to the velocity and the position of the optical pointing apparatus 71 respectively.

When the index shows the velocity or position is low, which means the air drone moves slow or close to the surface, thus the image-capturing device 700 can utilize more pixels to get a more detailed image for fine control. On the other hand, when the index shows the velocity or position is high, the air drone needs fast updated information in response to the fast status changing, then the image-capturing device 700 can utilize less pixels for fast processing and saving power.

To achieve the aforementioned objectives, when the velocity index exceeds a first reference value (or threshold), for example when the air drone reduces its speed, the image-capturing device 700 is configured to sense the image with a high-resolution arrangement of the image-sensing units, and when the velocity index exceeds a second reference value (or threshold), for example when the air drone increase its speed, the image-capturing device 700 is configured to sense the image with a low-resolution arrangement of the image-sensing units. Under other situation, when the position index exceeds a third reference value (or threshold), for example when the air drone reduces its height, the image-capturing device 700 is configured to sense the image with a high-resolution arrangement of the image-sensing units, and when the position index exceeds a forth reference value (or threshold), for example when the air drone increases its height, the image-capturing device 700 is configured to sense the image with a low-resolution arrangement of the image-sensing units. The resolution change is implemented by software and or hardware. For example, the software way is referred to, for example, change pixels of interest captured by the image-capturing device 700; and the hardware way is referred to, for example, activate or turn on different pixels of the image-capturing device 700 and deactivate or turn off some pixels.

For simplifying the algorithm, the first reference value can be set equal to the second reference value, or the third reference value can be bet equal to the forth reference value.

Figure 8A:
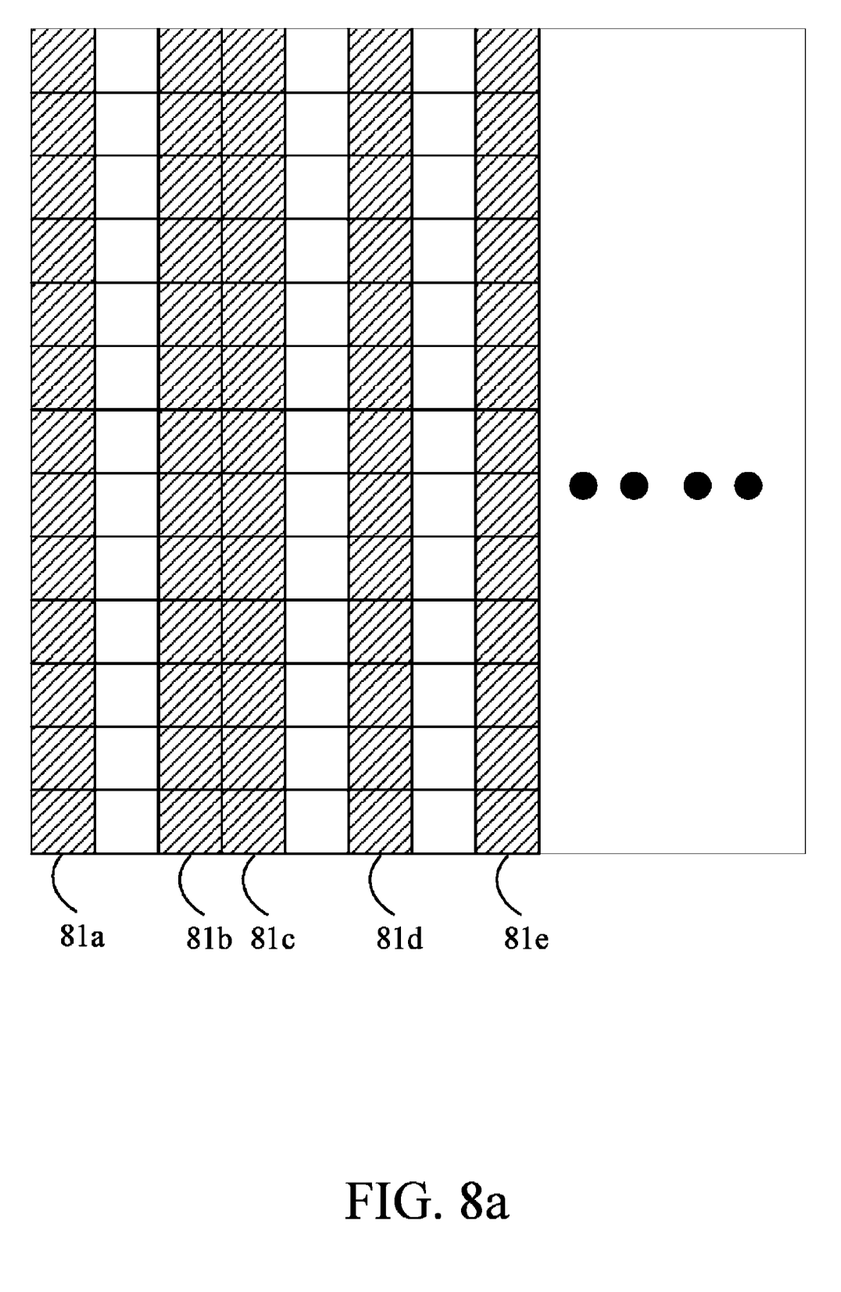
FIGS. 8a and 8b are arrangements of image-sensing units of the present invention.
Figure 8B:
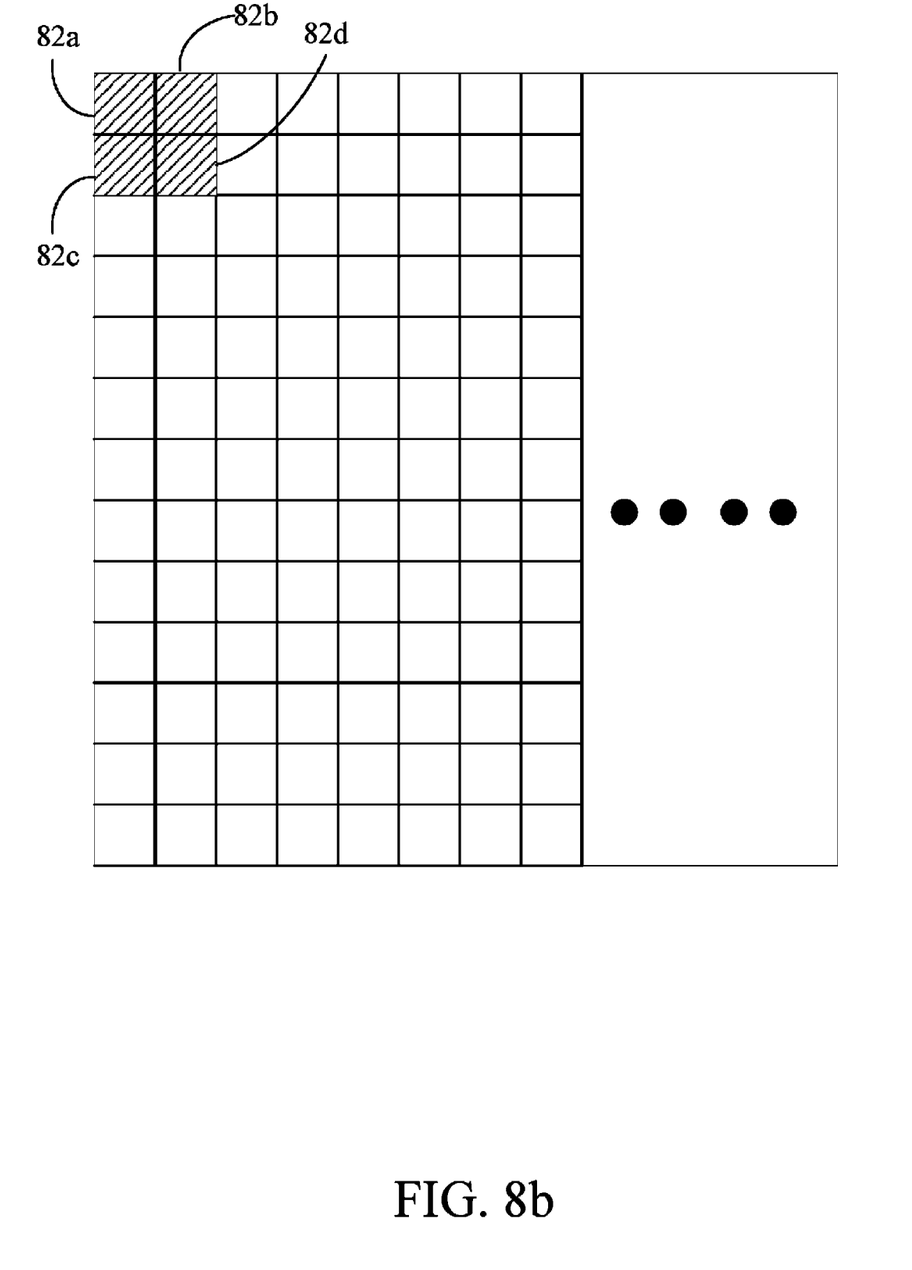

FIGS. 8a and 8b show two embodiments representing how to get less pixels image. FIG. 8a shows the image-capturing device 700 with a low-resolution arrangement of the image-sensing units by using at least some discontinuous image-sensing units to thus generate a captured image with less pixels. The arrangement uses columns 81a~81e of image-sensing units to generate a captured image, thus the image only contains less pixels than the case of using the whole image-sensing units. This embodiment applies a column selection to comply with conventional technology that does image processing with column base. That is, conventional technology processes each column of image-sensing units to get column sensing signals, then these column sensing signals are combined as a whole sensing signals, i.e. the frame image. If, applying global shutter technology, each image-sensing unit can be operated independently, thus the arrangement can be using a plurality of independent image-sensing units without being adjacent to each other, for example. People skilled in the art can vary the arrangement corresponding to different image processing technologies.

FIG. 8b shows the image-capturing device with a low-resolution arrangement of the image-sensing units by combining several sensing signals as a single sensing signal to thus generate a captured image with less pixels. The arrangement uses, for example, four sensing signals of the image-sensing units 82a~82d as a single sensing signal (e.g., summation or average of gray values of the image-sensing units 82a~82d), thus the image only contains 25% pixels comparing with the case of using the whole image-sensing units.

The image-sensing units of the image-capturing device of the present invention are not limited to the arrangement in which the small area image-sensing units are in the central region and the large area image-sensing units are in the circumambient region. In some embodiments of the present invention, the dimensions of the image-sensing units in the central region are larger than those of the image-sensing units in the circumambient region, and in other embodiments of the present invention, the image-sensing units can all be equal in size. The image-capturing device 700 of the present invention is not limited to an image-capturing device in which each output pixel corresponds to the output pixel information from an image-sensing unit. When the image-capturing device of the present invention is configured to use large-area or low CPI sensing field to sense a surface, each pixel of sensing signal generated by the image-sensing units can be formed by combining pixel information captured from a plurality of adjacent image-sensing units, wherein the combination of the pixel information from the plurality of adjacent image-sensing units can rely on binning techniques. In another embodiment of the present invention, when the image-capturing device of the present invention is configured to use a large-area or low CPI sensing field to sense a surface, each pixel is generated according to the pixel information from one of a plurality of adjacent image-sensing units.

In summary, an image-capturing device configured for an optical pointing apparatus can use different arrangements of image-sensing units to capture an image of a surface according to the velocity of the optical pointing apparatus. Therefore, the image-capturing device can track the movement of the optical pointing apparatus with sufficient CPI and without increasing image-sensing unit areas.

It will be apparent to those skilled in the art that various modifications and variations can be made to the disclosed embodiments. It is intended that the specification and examples be considered as exemplary only, with a true scope of the disclosure being indicated by the following claims and their equivalent.

What is claimed is:

1. An image-capturing device configured for a 3D space optical pointing apparatus, the image-capturing device comprising:
   a plurality of adjacently arranged image-sensing units configured to sense an image of a 3D space and generate successive plane frame images, each comprising a plurality of sensing signals, respectively, being adapted to evaluate a velocity and a position of the optical pointing apparatus relative to a surface,
   wherein the image-capturing device is configured to
      use different arrangements of the image-sensing units to sense the image of the 3D space, and
      generate at least one of a velocity index and a position index according to the velocity and the position of the optical pointing apparatus, respectively,
   wherein when the velocity index is lower than a first reference value, the image-capturing device is configured to sense the image with a high-resolution arrangement of the image-sensing units configured for sensing the image, and when the velocity index is higher than a second reference value, the image-capturing device is configured to sense the image with a low-resolution arrangement of the image-sensing units configured for sensing the image, and
   wherein when the position index is lower than a third reference value, the image-capturing device is configured to sense the image with a high-resolution arrangement of the image-sensing units configured for sensing the image, and when the position index is higher than a fourth reference value, the image-capturing device is configured to sense the image with a low-resolution arrangement of the image-sensing units configured for sensing the image.

2. The image-capturing device as claimed in claim 1, wherein the image-capturing device is configured to sense the image with a low-resolution arrangement of the image-sensing units by using at least some discontinuous image-sensing units to thus generate a captured image with less pixels.

3. The image-capturing device as claimed in claim 1, wherein the image-capturing device is configured to sense the image with a low-resolution arrangement of the image-sensing units by combining several sensing signals as a single sensing signal to thus generate a captured image with less pixels.

4. The image-capturing device as claimed in claim 1, wherein the sensing signal generated by the image-capturing device comprises at least one pattern, and the shape variation of the pattern is configured to estimate the position of the optical pointing apparatus relative to the surface; wherein the shape variation occupies more pixels as the optical pointing device being close to the surface and vice versa.

5. The image-capturing device as claimed in claim 4, wherein the optical pointing apparatus is configured to adjust the position relative to the surface according the shape variation.

6. The image-capturing device as claimed in claim 1, wherein the sensing signal generated by the image-capturing device comprises at least one pattern, and the patterns recognized as representing the same object in different frame images are configured to estimate the velocity of the optical pointing apparatus relative to the surface; wherein the displacement of the patterns recognized as representing the same object in different frame images increases as the optical pointing apparatus goes fast and vice versa.

7. The image-capturing device as claimed in claim 6, wherein the optical pointing apparatus is configured to adjust the velocity relative to the surface according to the displacement of the patterns recognized as representing the same object in different frame images.

8. The image-capturing device as claimed in claim 1, wherein the first reference value equals to the second reference value.

9. The image-capturing device as claimed in claim 1, wherein the third reference value equals to the fourth reference value.

10. The image-capturing device as claimed in claim 1, wherein more image-sensing units are utilized to sense the image in the high-resolution arrangement of the image-sensing units than in the low-resolution arrangement of the image-sensing units.

11. The image-capturing device as claimed in claim 1, wherein the
  in the high-resolution arrangement of the image-sensing units, all of the image-sensing units are utilized to sense the image, and
  in the low-resolution arrangement of the image-sensing units, some of the image-sensing units are not utilized to sense the image.

12. An image-capturing device configured for a 3D space optical pointing apparatus, the image-capturing device comprising:
  a plurality of adjacently arranged image-sensing units configured to sense an image of a 3D space and generate successive plane frame images, each comprising a plurality of sensing signals, respectively, being adapted to evaluate a velocity and a position of the optical pointing apparatus relative to a surface,
  wherein the image-capturing device is configured to
    use different arrangements of the image-sensing units to sense the image of the 3D space, and
    generate at least one of a velocity index and a position index according to the velocity and the position of the optical pointing apparatus respectively,
  wherein when the velocity index is lower than a first threshold, the image-capturing device is configured to sense the image with a first region of the image-sensing units, and when the velocity index is higher than a second threshold, the image-capturing device is configured to sense the image with a second region of the image-sensing units, and the first region has a higher pixel density than that of the second region.

13. The image-capturing device as claimed in claim 12, wherein the first threshold equals to the second threshold.

14. An image-capturing device configured for a 3D space optical pointing apparatus, the image-capturing device comprising:
  a plurality of adjacently arranged image-sensing units configured to sense an image of a 3D space and generate successive plane frame images, each comprising a plurality of sensing signals, respectively, being adapted to evaluate a velocity and a position of the optical pointing apparatus relative to a surface,
  wherein the image-capturing device is configured to
    use different arrangements of the image-sensing units to sense the image of the 3D space, and
    generate at least one of a velocity index and a position index according to the velocity and the position of the optical pointing apparatus, respectively,
  wherein when the velocity index is lower than a first threshold, the image-capturing device is configured to sense the image by taking a sensing signal of each of the image-sensing units as a single sensing signal, and when the velocity index is higher than a second threshold, the image-capturing device is configured to sense the image by combining sensing signals of more than one image-sensing units as a single sensing signal.

15. The image-capturing device as claimed in claim 14, wherein the combining comprises calculating a summation or an average of gray values of the more than one image-sensing units.

* * * * *